United States Patent [19]
Orshansky, Jr.

[11] 3,709,060
[45] Jan. 9, 1973

[54] NARROW RANGE HYDROMECHANICAL TRANSMISSION

[75] Inventor: Elias Orshansky, Jr., San Francisco, Calif.

[73] Assignee: Urs Systems Corporation, San Mateo, Calif.

[22] Filed: Feb. 16, 1971

[21] Appl. No.: 115,259

[52] U.S. Cl. .................................................. 74/687
[51] Int. Cl. ............................................. F16h 47/04
[58] Field of Search ................ 74/687, 681, 682, 686, 689–691, 74/720.5

[56] References Cited

UNITED STATES PATENTS

| | | | |
|---|---|---|---|
| 2,220,174 | 11/1940 | Ravigneaux | 74/759 |
| 2,687,049 | 8/1954 | Ebert | 74/687 |
| 3,199,376 | 8/1965 | De Lalio | 74/720.5 |
| 3,411,381 | 11/1968 | Orshansky, Jr. | 74/687 |
| 3,427,899 | 2/1969 | Gundersox et al. | 74/687 |

*Primary Examiner*—Arthur T. McKeon
*Attorney*—Owen, Wickersham & Erickson

[57] ABSTRACT

A narrow range power transmission. A planetary gear train has first and second sets of planet gears with a common carrier and intermeshed with each other. An input gear driven by driving means is meshed with the planet gears of the first set. One of two output gears is supported by the carrier, while the other is in mesh with the planet gears of the second set. A reaction gear is in mesh with the first set of planet gears and is connected to the driving means through a pair of hydraulic units, one serving as a pump while the other serves as a motor, and vice versa, for regulating the torque applied to the planet gears. During the time each output gear is engaged, one hydraulic unit serves as a motor at the lowest output speed within the speed range of that output gear and decreases its stroke as the output speed increases until its stroke reaches zero, and then its stroke increases in the opposite direction, as that hydraulic unit automatically becomes a pump. Meanwhile, the other hydraulic unit, serving as a pump at the lowest output speed within the speed range of that output, decreases its speed, and at zero speed becomes a motor with its speed thereafter increasing in the opposite direction as the output speed increases further.

13 Claims, 8 Drawing Figures

INVENTOR.
ELIAS ORSHANSKY, JR.
BY
Owen, Wickersham & Erickson
ATTORNEYS

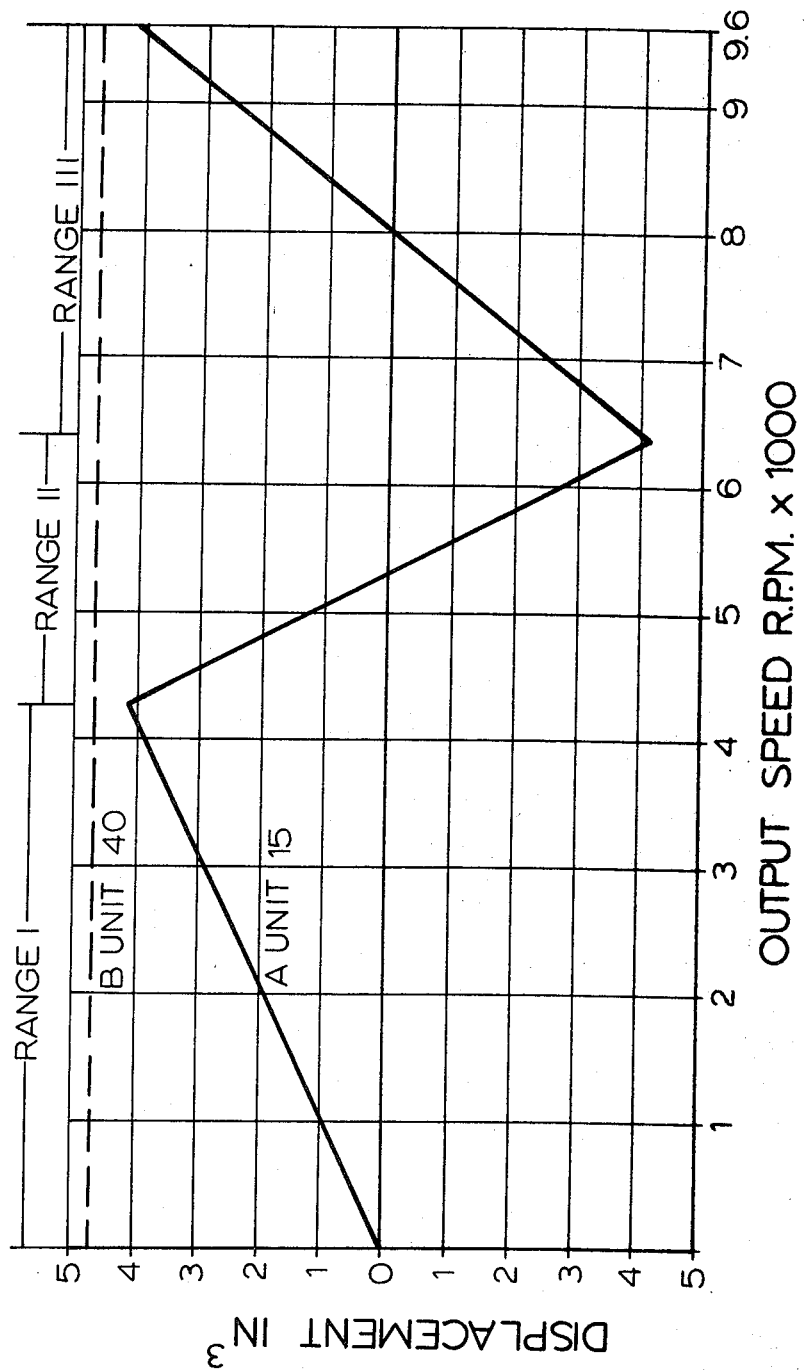

NARROW RANGE HYDROMECHANICAL TRANSMISSION

BACKGROUND OF THE INVENTION

This invention relates to a narrow range transmission in which a pair of hydraulic units is employed in conjunction with a planetary gear arrangement. The transmission is especially useful in racing cars and sports cars.

In racing cars very large horsepower must be handled. In a hydromechanical transmission it is therefore important to have a structure wherein over-large hydraulic units can be avoided and wherein the ratio between the maximum and minimum speeds in any transmission range is small. It is also desirable for the ratio to be the same in the different ranges. The transmission of this invention has infinite speed variation from zero output to a maximum output, but it has narrow range, meaning that the ratio of the maximum torque that it develops at full horsepower to the minimum torque that it develops at full horsepower, is small — e.g., 2.25 to 1.

In a prior invention, I provided a planetary gear arrangement with two sets of planet gears on a common carrier and meshed with each other. That arrangement is also used in the present invention, but there are quite different arrangements elsewhere. In the prior invention, each set of planets meshed with a separate output member, typically two separate ring gears. In the present invention, only one of the output members — typically a seen gear — meshes with a set of planet gears. The other output member is rigidly secured to or is part of the planet carrier.

The present invention is characterized by great simplicity and by transmitting a very small percentage of its power hydraulically.

The invention is also significant in its reducing the corner horsepower of the hydraulic units to substantially the smallest feasible amount. Corner horsepower means the maximum horsepower that the unit would be capable of if it ran at a combination of its maximum torque and its maximum speed. While this condition never actually arises, it does govern the size of the hydraulic units. By holding down the corner horsepower, the size of the hydraulic units is held down.

BRIEF SUMMARY OF THE INVENTION

The power transmission of this invention comprises input means, output means, and a pair of gear trains for alternately connecting the input means to the output means and for providing transmission ranges of different ratios. Each train includes a planetary gear set with the planet gears of a first set being intermeshed with the planet gears of a second set, and both sets have a common carrier. The input means is connected to the planet gears of the first planetary gear set, preferably through a ring gear. The common carrier comprises an output member of one of the gear trains, and for this purpose carries or provides or is rigidly connected to an output gear. A first sun gear comprises an output member of the other gear train and is meshed with the planet gears of the second planetary gear set. A second sun gear is meshed with the planet gears of the first set and serves as the reaction member of the planetary gear arrangement. The end of the range of one train overlaps the end of the range of the other train, and the gear trains are alternately connected and disconnected to the output means at those overlapping ends. As a result, power is transmitted alternately from the gear trains to drive the output means through its speed range. The ratio of maximum to minimum output speed, at a constant input speed, is the same in each train.

A reaction shaft is connected to and is in driving relation with the second sun gear and is connected to and is in driving relation with a first hydraulic unit. A second hydraulic unit is connected hydraulically to the first hydraulic unit and is in driving relation with the input means. One hydraulic unit is operated as a pump while the other is operated as a motor, and vice versa. These provide the hydraulic part of the hydromechanical operation.

For purposes of starting and reverse, there are clutched for alternately connecting and disconnecting the reaction shaft to the output means, the reaction shaft being connected to the output means when both gear trains are disconnected from the output means, There is an overlapping shift from the starting combination to one gear train.

Other objects and advantages of the invention will become apparent from the following description and illustration of a preferred embodiment exemplifying but not limiting the invention.

BRIEF DESCRIPTION OF THE DRAWINGS

In the drawings:

FIG. 8 is a graph of the hydraulic units displacement for the device of FIGS. 1–3, with the displacement in cubic inches plotted against the output speed in increments of 1,000 RPM.

DESCRIPTION OF A PREFERRED EMBODIMENT

Figure 1:
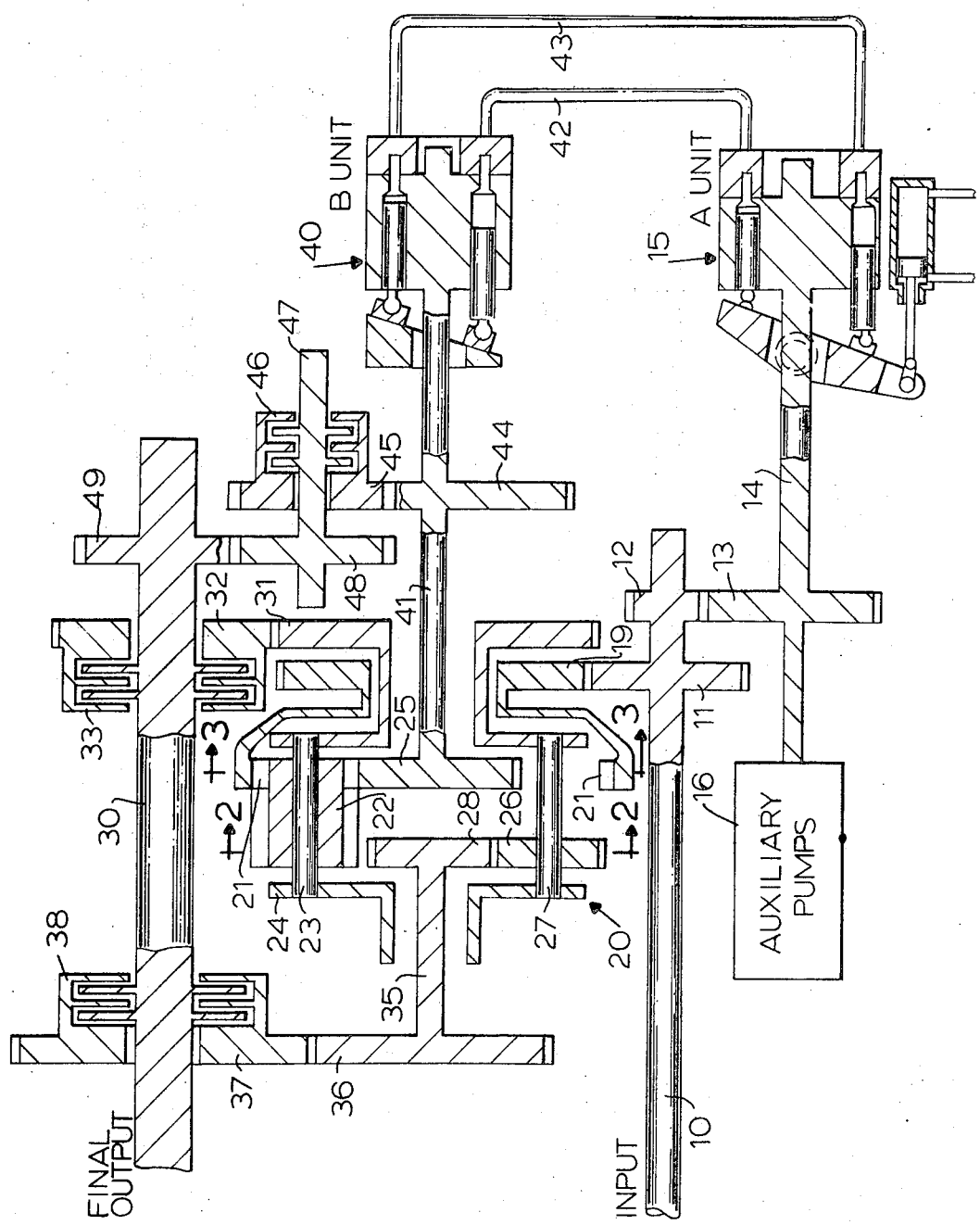
FIG. 1 is a somewhat diagrammatic view in elevation and in section of a transmission embodying the principles of the invention.
Figure 2:
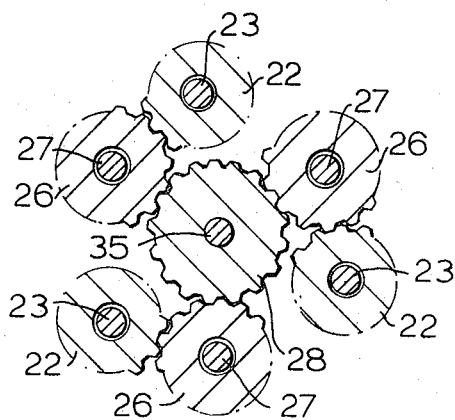
FIG. 2 is a view in section taken along the line 2—2 in FIG. 3.
Figure 3:
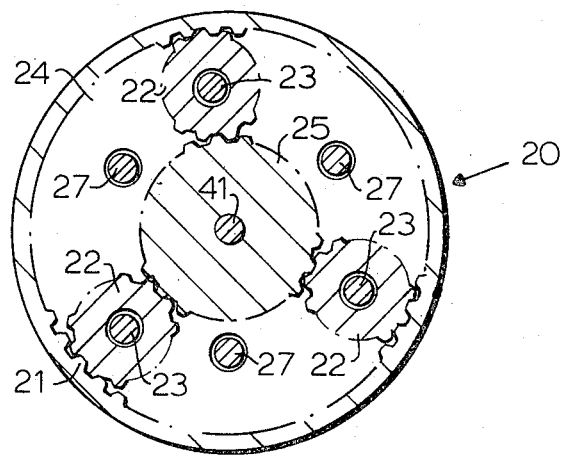
FIG. 3 is a view in section taken along the line 3—3 in FIG. 1.

The device of FIGS. 1–3 has particular usefulness as a transmission for a racing car, but it may have other uses, too, as in sports cars. FIGS. 4–8 illustrate various properties and features of the transmission of FIGS. 1–3.

An input shaft 10 delivers power from an engine or other source of power to two gears 11 and 12 mounted on the shaft 10. The gear 12 meshes with and drives a gear 13 on a shaft 14, which is connected to a hydraulic unit 15 and to auxiliary pumps 16. Since the race car input may run close to 10,000 RPM, and since hydraulic units are not capable of anything near this speed, it is necessary to have the gear ratio provided by the gears 12 and 13 between the input shaft 10 and the hydraulic unit 15.

The auxiliary pumps 16 serve the following purpose: due to high speed of rotation, the transmission case (not shown) is operated with a dry sump; so one of the pumps 16 scavenges the case, drives the oil through an oil cooler, and returns it to an oil reservoir. Another one of the pumps 16 picks up oil from the reservoir, and puts it through a filter and through a check valve into whichever hydraulic line (e.g., 42, 43) is the low pressure line. This makes up leakage within the hydraulic system and feeds oil through orifices for lubrication of gears and bearings. A relief valve maintains the outlet of this second pump at about 180 PSI. A third one of the pumps 16 picks up the oil from the reservoir and supplies pressure for clutch and hydraulic unit actuation. A relief valve for this circuit is set at approximately 400 PSI. It is possible to combine some or all of the functions of these pumps 16; so two or even one pump may be used to serve all the above functions.

The gear 11 drives a gear 19, which is connected to or is an integral part of an input member of a planetary assembly 20. This input member may be a ring gear 21 that meshes with each of three planet gears 22 that are mounted on shafts 23 of a carrier 24. Only one planet gear 22 is shown in FIG. 1, the other two being shown in FIG. 3. The planet gears 22 mesh with a reaction gear 25, which may be a sun gear, and they also mesh with another set of planet gears 26 on shafts 27 of the carrier 24. Only one of the gears 26 is shown in FIG. 1, the other two being shown in FIG. 2. Thus, each of the three planets 22 meshes with one of the three planets 26, and all are carried by the same carrier 24.

The planets 26 mesh with an output sun gear 28, one of two outputs from the planetary assembly 20 which are used in alternation to drive an output shaft 30. The other output member is the carrier 24, which is equipped with an output gear 31 that meshes with a gear 32, which is mounted around the output shaft 30 and is clutchable to it by a clutch 33. The sun gear 28 is connected, as by a shaft 35, to an output gear 36, which meshes with a gear 37 that is mounted around the output shaft 30 and is clutchable to it by means of a clutch 38. The clutches 33 and 38 are shown herein as friction clutches, and are actuated in the usual manner to transmit drive from their gears 32 and 37 to the shaft 30. In place of friction clutches, there may be mechanical tooth-type clutches, since the synchronization of relatively rotating parts is extremely close at the time of clutch engagement. The carrier 24 and its associated gear 31 comprise the output for Range II of FIGS. 4–8, while the sun gear 28 and its associated gear 36 comprise the output for Range III of those figures. Shift is accomplished at a synchronous speed, at an overlap of Range II and Range III, when the gears 32 and 37 are moving at the same speed, by first clutching the gear 37 to the shaft 30 and then de-clutching the gear 32.

The reaction gear 25 is connected to a hydraulic unit 40 of fixed displacement by a shaft 41. The hydraulic units 15 and 40 are hydraulically interconnected by a series of conduits 42 and 43 (etc.). The hydraulic A unit 15 serves as a pump while the other B unit 40 serves as a motor, and the B unit 40 serves as a pump while the A unit 15 serves as a motor. These units 15 and 40 regulate the torque applied to the gears in the planetary assembly 20. During the time each output gear 31 and 36 is engaged, the hydraulic A unit 15 serves as a motor at the lowest output speed within the speed range of that output gear 31 or 36 and decreases its stroke as the output speed increases. The stroke of the A unit 15 reaches zero, and then its stroke increases in the opposite direction, as the hydraulic B unit 15 automatically becomes a pump. Meanwhile the hydraulic B unit 40, which retains a constant stroke, serves as a pump at the lowest output speed within the speed range of that output and gradually decreases its speed. At zero speed, the B unit 40 becomes a motor, with its speed thereafter increasing in the opposite direction as the output speed increases further. Then at the shift from one output gear 31 to the other output gear 36, the hydraulic B unit 40, which just before the shift was serving as a motor, immediately thereafter serves as a pump, and vice versa for the A unit 15.

The shaft 41 carries a gear 44 meshing with a gear 45. The gear 45 can be clutched by a clutch 46 to an intermediate shaft 47 on which is mounted a gear 48 that, in turn, meshes with a gear 49 secured to the output shaft 30. The clutch 46 is actuated in Range I of FIGS. 4–8 and is used for starting; it is also used for reverse. Direction is determined by the position of the stroke-varying mechanism of the hydraulic A unit 15. Range II is used in mid-range speed in which the clutch 33 is actuated, and in Range III, for high speed, the clutch 38 is actuated. Normally, only one clutch 33, 38, or 46 is engaged at a time, but during shifting there is an overlap, first from the clutch 46 to the clutch 33 and later from the clutch 33 to the clutch 38.

In order to accomplish a continually variable output speed while going through three ranges, it is necessary for the speeds of the members to be engaged to be very closely synchronized before engagement, and for the members to be disengaged, they must also be closely synchronized immediately after the moment of disengagement.

Thus, in going from Range I to Range II, the speed of the gear 32 is very closely synchronized to the speed of the shaft 30 prior to the engagement of clutch 33, and then, after the clutch 33 is engaged, the clutch 46 is disengaged with a very small overlap of time, e.g., a small fraction of a second, for the gears 45 and 48 rotate at very close synchronization with each other.

Similarly, in going from Range II to Range III, just prior to the shift into Range III, the gear 37 is closely synchronized with the speed of the shaft 30, then the clutch 38 is engaged, then immediately the clutch 33 is disengaged, the gear 32 still being very closely synchronized to the shaft 30 immediately after disengagement.

In actual practice on test, the synchronization is so close that the shifts cannot be detected except by sensitive instruments; so the use of mechanical dog clutches in place of friction clutches is feasible.

Figure 4:
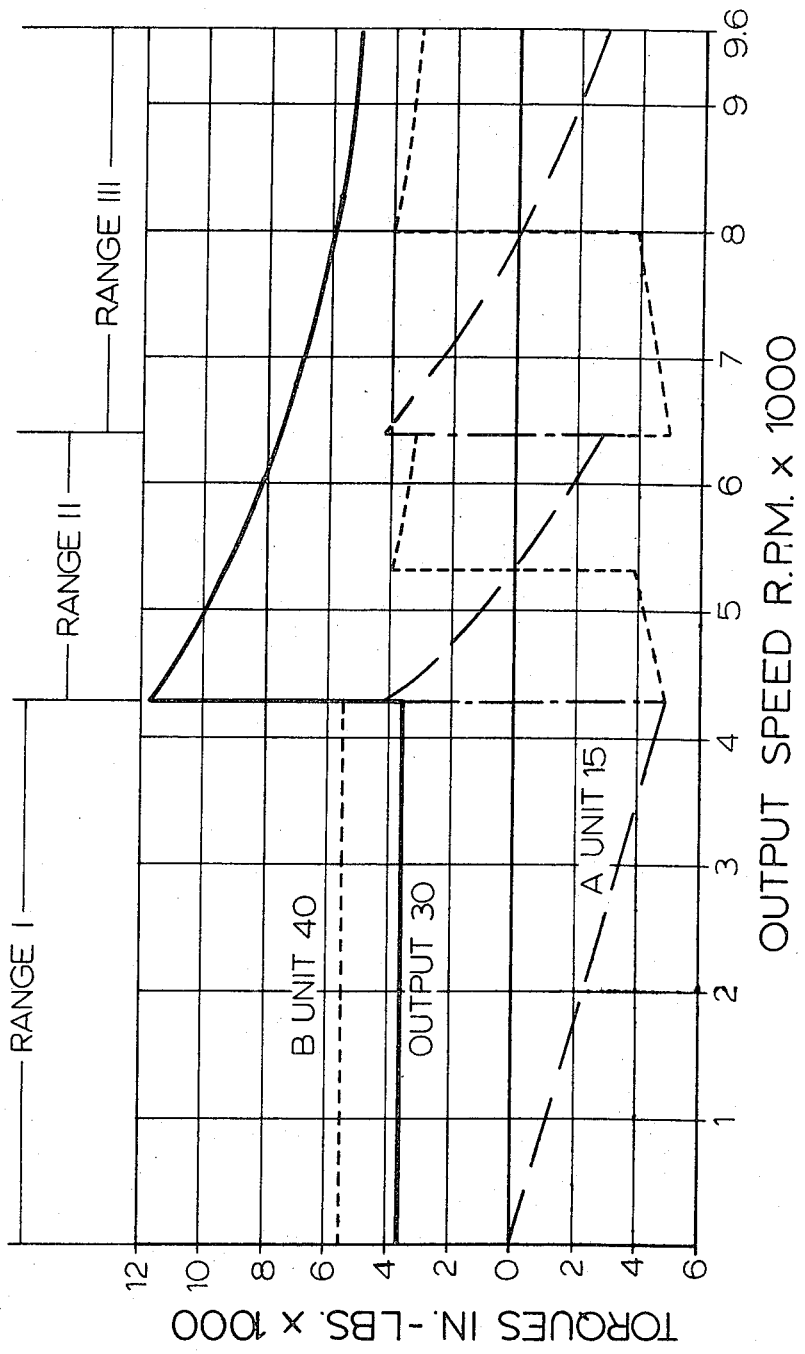
FIG. 4 is a graph of the transmission and hydraulic unit torques produced by the form of the invention shown in FIGS. 1–3, with the torques in thousand-pound increments plotted against the output speed in thousand-RPM increments.

FIG. 4 shows the torques of the final output member 30 as well as the torques of the A and B hydraulic units 15 and 40. In Range I the torque is quite low. This is permissible in a racing car starting condition, in order to enable the use of small hydraulic units, for the horsepower of the engine is extremely high; for example, it may be 800 horsepower. Such a low torque would not be permissible in a normal passenger car or in truck installations. The permissible quantity of hydraulic horsepower transmitted by the racing car must be very low, due to the weight of the hydraulic unit as well as to the necessity for maintaining very high efficiency. For example, with an 800-horsepower car, hydraulic units with a capacity of only 200 horsepower can be used for this invention, and when the transmission is in Range I where the power is transmitted solely by the hydraulic means, although the hydraulic means do not have the capacity to supply the full torque and hence make the starting torque low, this condition is tolerable for a racing car. Since this condition occurs only at the very start of the rolling speed of the car when it comes out of the pit, it is not objectionable from a practical standpoint, though it could not be used in a passenger vehicle or in a truck where full torque is needed at the lowest speed.

Figure 5:
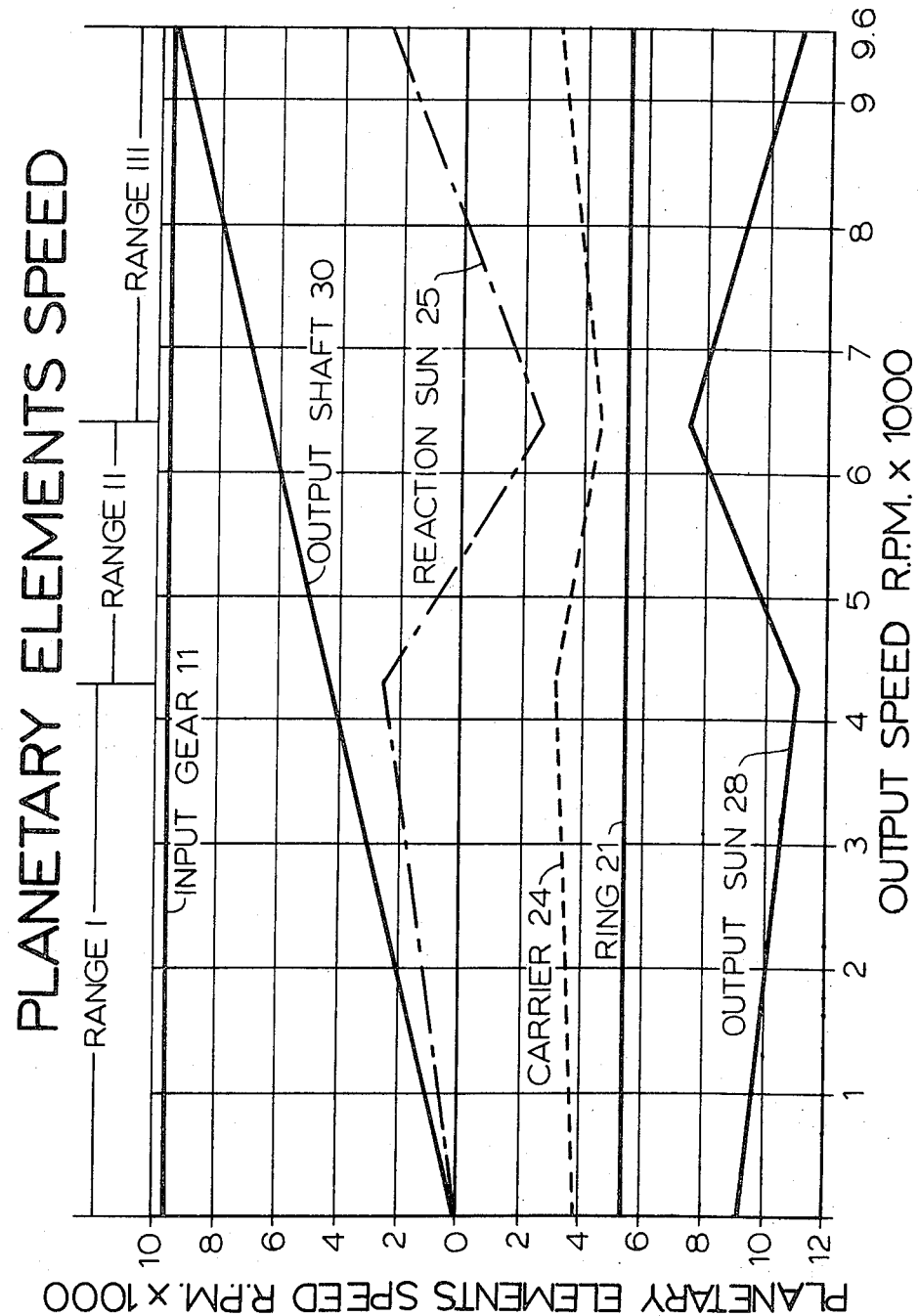
FIG. 5 is a graph of the planetary elements speed of the device of FIGS. 1–3; the speed of the planetary elements in increments of 1,000 RPM is plotted against the output speed in increments of 1,000 RPM.

FIG. 5 shows the speed relationships of various elements, all labeled, under conditions of constant input speed as represented by the input gear 11 and variable output speeds as shown in the bottom scale. The hydrostatic system used in Range I is also used to reverse the transmission, by reversing the stroke-adjusting mechanism of the hydraulic A unit 15, which reverses the flow of the fluid in the conduits 42 and 43.

Figure 6:
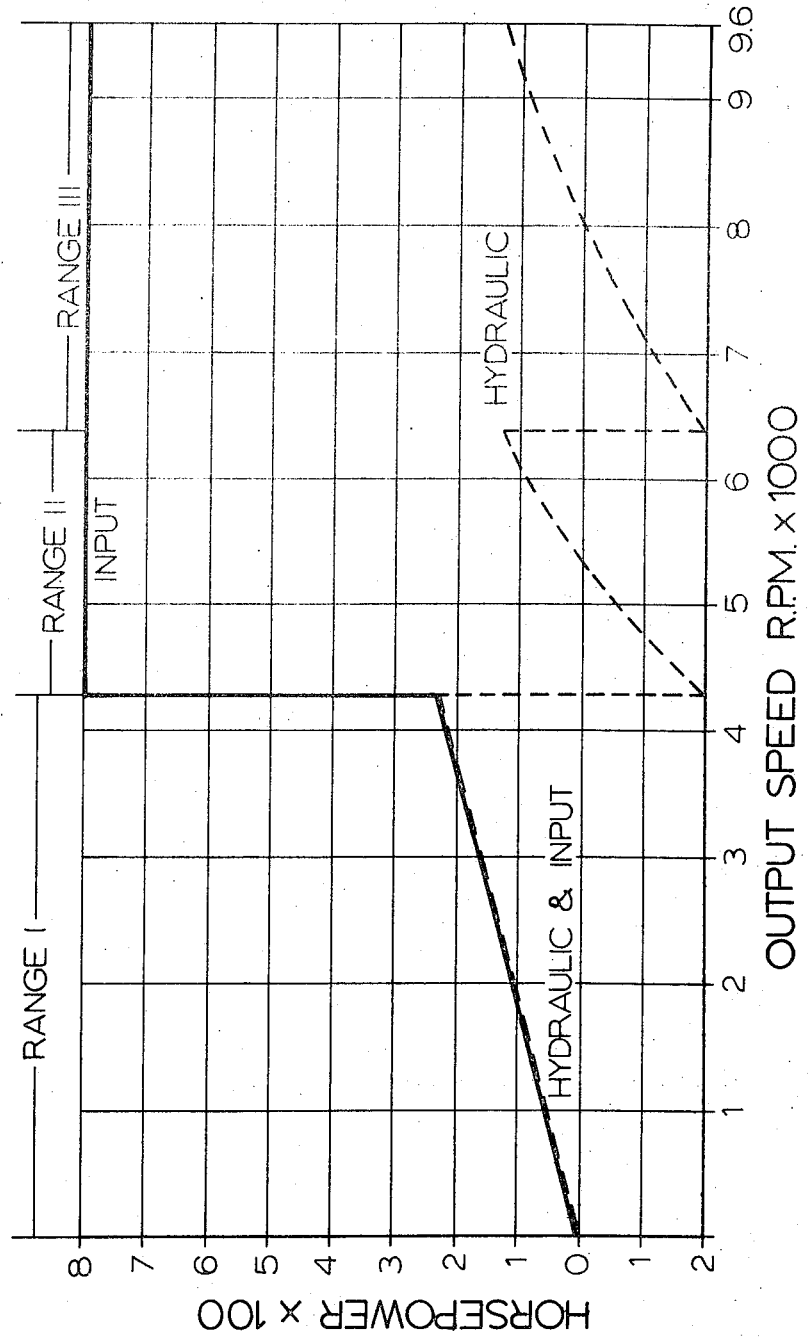
FIG. 6 is a graph of the hydraulic and mechanical horsepowers of the device of FIGS. 1–3, with the horsepower in increments of 100 plotted against the output speed in increments of 1,000.

The actual racing range of the car is in Ranges II and III, when the transmission handles full horsepower, as shown in FIG. 6. In the particular construction of this invention, regenerative horsepower exists. In FIG. 6, the curve labeled "Hydraulic" goes below the zero point in the first part of Range II and also in the first part of Range III, thereby indicating regenerative horsepower. What this means is, that the hydraulic system recirculates the power back into the planetary assembly 20, and the total horsepower handled within the planetary assembly 20 at the lower speed of each range is therefore, in this instance, one thousand, becoming eight hundred halfway through the range when the regenerative horsepower disappears. Beyond that point, the hydraulic power becomes additive; in other words, the transmitted horsepower is split between the mechanical and the hydraulic systems, so that the hydraulic horsepower transmitted at the high speed end of each range is approximately 130 compared to about 670 for the mechanical horsepower. In a racing transmission this regenerative horsepower is permissible, because there is not much of it and because too much weight would have to be added to the vehicle in order to eliminate it, and that weight would be less desirable than the retention of the small amount of regenerative horsepower, Thus, in each range, the speed variation is very narrow, a ratio of maximum speed to minimum speed of about 1.5:1, so that the amount of horsepower transmitted hydraulically, whether regenerative or not, is low, as is shown in FIG. 6.

Figure 7:
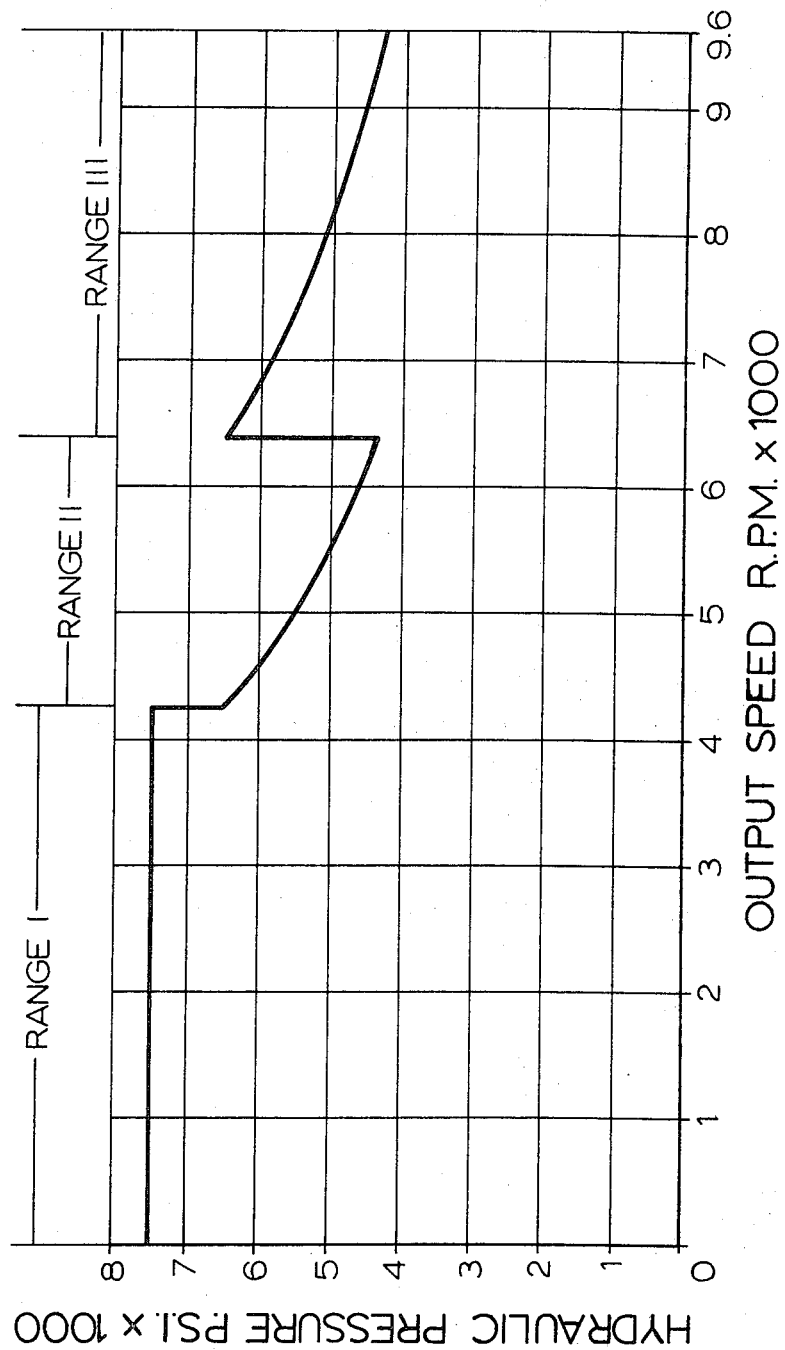
FIG. 7 is a graph of the hydraulic pressure for the device of FIGS. 1–3 with the hydraulic pressure in pounds per square inch in increments of one thousand plotted against the output speed in increments of 1,000 RPM.

FIG. 7 shows the hydraulic pressure in each range, while FIG. 8 shows the displacement of the variable-stroke A unit 15 at various conditions. The displacements above the zero line indicate a different direction of liquid flow from the displacements below the zero line, in conduits 42 and 43. The stroke of the B unit 40 remains constant. The entire speed control in each range is accomplished by the stroke variation of the A unit 15, and the selection between ranges depends on the actuation of the clutches.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A power transmission comprising
driving means,
a planetary gear train drivably connected to said driving means and having first and second sets of planet gears with a common carrier serving as one output of said planetary gear train, one set of planet gears being intermeshed with the other, an input gear driven by said driving means and meshed with the planet gears of said first set, an output gear in mesh with the planet gears of said second set, and a reaction gear in mesh with said first set of said planet gears,
a final output means,
means for alternately connecting the output from said carrier and the output from said output gear to said final output means, and
means connecting said reaction gear to said driving means through a pair of hydraulic units, one serving as a pump while the other serves as a motor and vice versa, for regulating the torque applied to said planet gears.

2. The power transmission of claim 1 having clutching means for connecting said final output means to said means connecting said reaction gear to said driving means.

3. The power transmission of claim 1 wherein during the time each said output gear is engaged, the hydraulic unit serving as a motor at the lowest output speed within the speed range of that output gear decreases its stroke as the output speed increases until said stroke reaches zero and then increases its stroke in the opposite direction as that said hydraulic unit automatically becomes a pump, while the other hydraulic unit, serving as a pump at the lowest output speed within the speed range of that output decreases its speed, and at zero speed becomes a motor with its speed thereafter increasing in the opposite direction as the output speed increases further.

4. The power transmission of claim 3 wherein at the shift from the output of said output gear to the output of said carrier as the means connected to said final output means, the hydraulic unit which before the shift was serving as a motor immediately thereafter serves as a pump, and vice versa.

5. The power transmission of claim 4 having means for determining that the ratio of maximum to minimum output speed, at a constant input speed, is the same for each planetary output.

6. A power transmission comprising input means, output means, and a pair of gear trains for alternately connecting said input means with the output means and providing transmission ranges of different ratios, each train including a planetary gear set with the planet gears of a first set being intermeshed with the planet gears of a second set and a common carrier for both sets of planet gears, said input means being connected to the planet gears of the first planetary gear set through a ring gear, said common carrier comprising an output member of one said gear train, a first sun gear comprising an output member of the other said gear train and meshed with the planet gears of the second planetary gear set, a second sun gear meshed with the planet gears of said first set and serving as the reaction member, a reaction shaft connected to and in driving relation with said second sun gear and a first hydraulic unit connected to and in driving relation with said reaction shaft, a second hydraulic unit connected hydraulically to said first hydraulic unit and in driving relation with said input means, one said hydraulic unit being operated as a pump while the other is operated as a motor and vice versa, the end of a said range of one train overlapping the end of a said range of the other train, and means for alternately connecting and disconnecting the gear trains to the output means at said overlapping ends, whereby power is transmitted alternately from said gear trains to drive the output means through its speed range.

7. The power transmission of claim 6 having means for determining that the ratio of maximum to minimum output speed, at a constant input speed, is the same in each train.

8. The power transmission of claim 6 wherein said first hydraulic unit has a variable stroke and said second hydraulic unit has a fixed stroke.

9. The power transmission of claim 6 having means for alternately connecting and disconnecting said reaction shaft to said output means, said reaction shaft being connected to said output means when both said gear trains are disconnected from said output means, for starting purposes and for reverse operation, with an overlapping shift from the starting combination to one said gear train.

10. A power transmission comprising
an input shaft,
an output shaft,
first and second input gears mounted on said input shaft,
a planetary gear arrangement having a common carrier carrying first and second sets of planet gears intermeshed with each other, an output sun gear, a reaction sun gear, and a ring gear having integral therewith a gear meshed with said first input gear, said common carrier having integral therewith an output gear,
first and second gears mounted on said output shaft,
first and second clutches for respectively clutching said first and second gears to said output shaft, said first gear being meshed with said carrier's output gear,
a gear rigidly integral with said sun output gear and meshed with said second gear on said output shaft,
a reaction shaft connected to and in driving relation with said reaction sun gear,
a first hydraulic unit connected to and in driving relation with said reaction shaft,
a second hydraulic unit connected hydraulically to said first hydraulic unit,
an auxiliary shaft supporting and in driving relation with said second hydraulic unit, and
a gear on said auxiliary shaft meshing with said second input gear,
one said hydraulic unit being operated as a pump while the other is operated as a motor and vice versa.

11. The power transmission of claim 10 wherein the stroke of said first hydraulic unit is variable and the stroke of said second hydraulic unit is fixed.

12. The power transmission of claim 10 having
a third gear on said output shaft,
an intermediate gear meshed with said third gear,
a gear mounted on said reaction shaft,
a second intermediate gear meshed with the said gear mounted on said reaction shaft, and
a third clutch for alternately connecting and disconnecting said intermediate gears to each other for starting and for reverse operations, with an overlapping shift from the starting combination to said first clutch.

13. The power transmission of claim 10 having auxiliary pump means driven by said auxiliary shaft.

* * * * *